Oct. 6, 1942. B. STECHBART 2,298,087

ADJUSTABLE SUPPORT MECHANISM

Filed Aug. 2, 1940

INVENTOR
BRUNO STECHBART
BY Robert F. Miehle, Jr.
ATTY.

Patented Oct. 6, 1942

2,298,087

UNITED STATES PATENT OFFICE 2,298,087

ADJUSTABLE SUPPORT MECHANISM

Bruno Stechbart, Chicago, Ill., assignor to The Bell & Howell Company, Chicago, Ill., a corporation of Illinois Application August 2, 1940, Serial No. 349,801

3 Claims. (Cl. 248—11)

My invention relates to adjustable support mechanism which is particularly adapted for use as a "tilt" support for picture projectors.

The general object of the invention resides in the provision of a novel, effective and conveniently adjustable support mechanism, preferably involving simultaneously adjustable spacedly extending legs, which is susceptible of compactness particularly vertically, say for use with a shallow base, which is adapted for unobtrusive enclosure of the mechanism thereof in such base, and which does not interfere with the ornamental appearance of the base.

With this object in view, my invention consists in certain features of novelty in the construction, combination and arrangement of parts by which the said object and certain other objects, hereinafter appearing, are effected all as fully described with reference to the accompanying drawing and more particularly pointed out in the appended claims.

In the said drawing—

Figure 1:
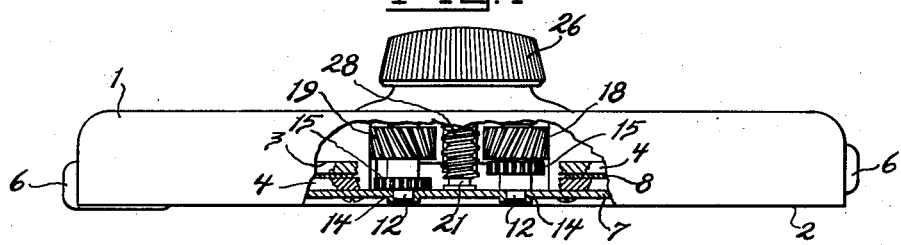
Figure 1 is a top plan view of an end portion of a base or frame equipped with the adjustable support mechanism of my invention, parts being broken away or shown in section.
Figure 2:
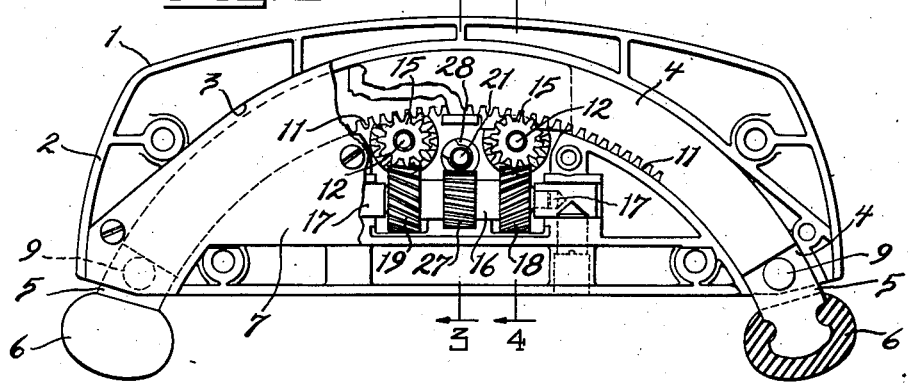
Figure 2 is transverse elevation of the same looking toward the inner face thereof with parts broken away or shown in section.
Figure 3:
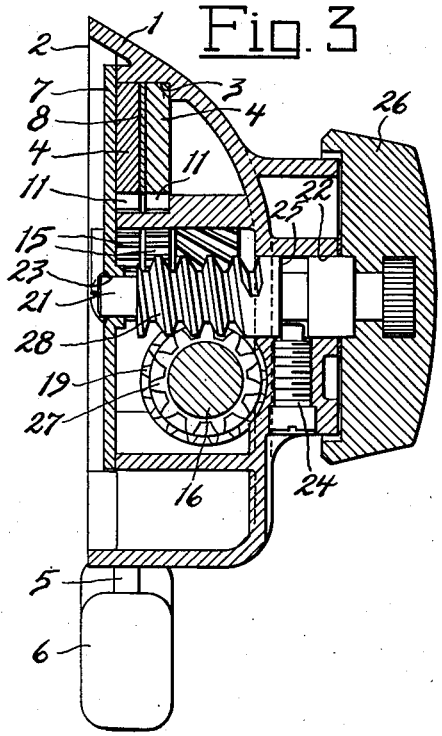
Figure 3 is an enlarged sectional view substantially on the line 3—3 of Figure 2.
Figure 4:
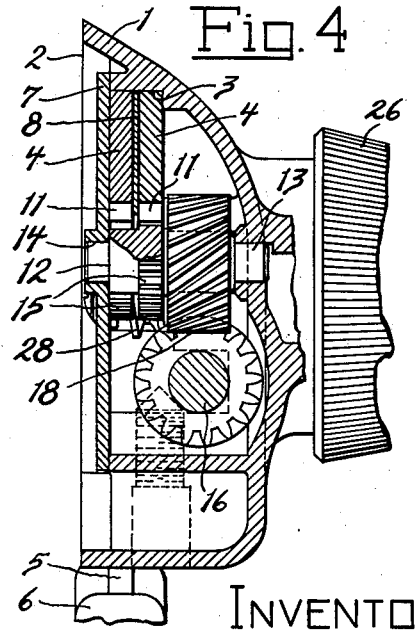
Figure 4 is an enlarged sectional view substantially on the line 4—4 of Figure 2.

Referring to the drawing, I designates a hollow end base or frame part forming an enclosure and provided with a flat inner face 2 for securing this base part on the end of a main base or frame part not shown. The frame part I is provided with an interior arcuate channel or slide bearing 3 arranged in a transverse vertical plane and having the ends thereof extending downwardly, as best shown in Figure 2. Two longitudinally arcuate legs 4 are slidably mounted in the slide bearing 3 in corresponding overlapping relation for independent corresponding longitudinal arcuate movement to spacedly variably extend from the frame part with opposite end portions 5 thereof which are provided with suitable end contact formations 6, preferably of non-metallic moulded material for contact with a flat supporting member such as a table top, not shown, to support the frame part thereon.

The legs 4 are retained in the slide bearing 3 by a vertical plate 7 secured on the frame part I and extending across the slide bearing to form a side bearing surface for the adjacent leg, and a bearing spacer 8 is interposed between the legs. Movement of the legs in the retracting direction thereof is limited by lateral studs 9 on the end portions 5 engaging the other ends of the legs, as shown in Figure 2.

The concave edge portions of the legs 4 are provided with internal spur gear racks 11, and horizontal transversely spaced parallel shafts 12 are rotatably mounted on and within the frame part I by means of bearings 13 on the frame part and bearings 14 on the plate 7, and fixed on these shafts within the frame part are spur gears 15 which are axially offset and mesh respectively with the racks 11 for actuating the legs 4. A horizontal shaft 16, disposed on an axis transverse to the axes of the spur gears 15, is rotatably mounted on and within the frame part I by means of bearings 17, and this shaft is operatively connected with the shafts 12 by means of right and left sets of spiral gearing 18 and 19 within the frame part I, whereby rotation of the shaft 16 effects simultaneous opposite rotation of the spur gears 15 and consequent simultaneous opposite longitudinal movement of the legs 4 to retract or extend them in correspondence.

A shaft 21 is rotatably mounted on and within the frame part I on an axis parallel to and between the shafts 12 by means of a bearing 22 on the frame part I and a bearing 23 on the plate 7, end thrust of this shaft being prevented by a screw stud 24 on the frame part I engaging in a circumferential groove 25 on the shaft. The shaft 21 projects from the frame part I and is provided with an exterior manipulating knob 26 for manual rotation of the shaft. The shaft 21 is operatively connected with the shaft 16 by self-locking worm gearing within the frame part I and comprising a worm gear 27 on the shaft 16 and a worm 28 on the shaft 21 and meshing with a worm gear 27.

Manual rotation of the knob 26 conveniently effects simultaneous movement of the legs 4 in opposite directions to retract or extend the same, depending upon the direction of rotation of the knob, the self-locking worm gearing comprising the worm gear 27 and the worm 28 retaining the legs in adjusted position.

While I have thus described my invention, I do not wish to be limited to the precise details described, as changes may be readily made without departing from the spirit of my invention, but having thus described my invention, I claim as new and desire to secure by Letters Patent the following:

1. In a supporting mechanism, the combination with a frame provided with an elongated arcuate bearing, of a correspondingly longitudinally arcuate leg engaged in said bearing for corresponding longitudinal arcuate movement to variably extend from said frame and provided with a corresponding longitudinal arcuate spur gear rack, a spur gear rotatably mounted on said frame and meshing with said rack, and manually actuated self-locking worm gearing rotatably mounted on said frame and operative on said spur gear.

2. In supporting mechanism, the combination with a frame provided with an elongated arcuate bearing means, of two correspondingly longitudinally arcuate legs engaged in said bearing means for independent corresponding longitudinal arcuate movement to spacedly variably extend from said frame and provided with corresponding longitudinal arcuate spur gear racks, spur gears rotatably mounted on parallel axes on said frame and meshing respectively with said racks, a shaft rotatably mounted on an axis transverse to said spur gear axes, right and left spiral gearings operatively connecting said shaft with said spur gears to simultaneously actuate them in opposite directions, and manually actuated worm gearing operative to actuate said shaft.

3. In a supporting mechanism, the combination with a frame forming an enclosure and provided therein with elongated arcuate bearing means, of two correspondingly longitudinally arcuate legs engaged in said bearing means for independent corresponding longitudinal arcuate movement to spacedly variably extend from said frame and provided with corresponding longitudinal arcuate spur gear racks, spur gears rotatably mounted on and within said frame, and means manually operable from the exterior of said frame for simultaneously actuating said spur gears in opposite directions.

BRUNO STECHBART.